United States Patent [19]
Cook

[11] 3,709,201
[45] Jan. 9, 1973

[54] LOW EMISSION INTERNAL COMBUSTION ENGINE AND METHOD OF IMPROVING COMBUSTION

[75] Inventor: Harvey A. Cook, Cleveland, Ohio
[73] Assignee: TRW Inc., Cleveland, Ohio
[22] Filed: March 1, 1971
[21] Appl. No.: 119,532

[52] U.S. Cl. ................................................. 123/64
[51] Int. Cl. ........................................... F02b 75/02
[58] Field of Search ...................................... 123/64

[56] References Cited
UNITED STATES PATENTS

| | | | |
|---|---|---|---|
| 1,068,173 | 7/1913 | Schimanek | 123/64 |
| 1,771,335 | 7/1930 | Karpes | 123/64 |
| 1,882,971 | 10/1932 | Schimaner | 123/64 |

FOREIGN PATENTS OR APPLICATIONS 279,373  12/1927  Great Britain .......................... 123/64

*Primary Examiner*—Wendell E. Burns
*Attorney*—Hill, Sherman, Meroni, Gross & Simpson

[57] ABSTRACT

A method for improving the combustion of an internal combustion engine and an internal combustion engine having a low exhaust emission characterized by subjecting the compressed air-fuel mixture to an expansion and second compression step prior to ignition to produce the power stroke. An example of an embodiment of an engine incorporating these features is a six stroke engine having a power stroke, exhaust stroke, intake stroke, a fuel preparation compression stroke, a fuel preparation expansion stroke, and a compression stroke ending in ignition.

4 Claims, 3 Drawing Figures

PATENTED JAN 9 1973 3,709,201
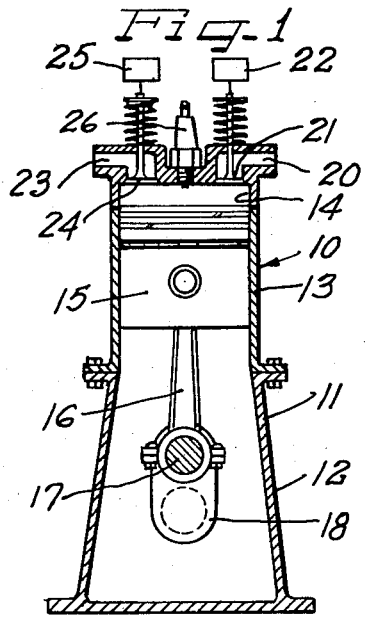
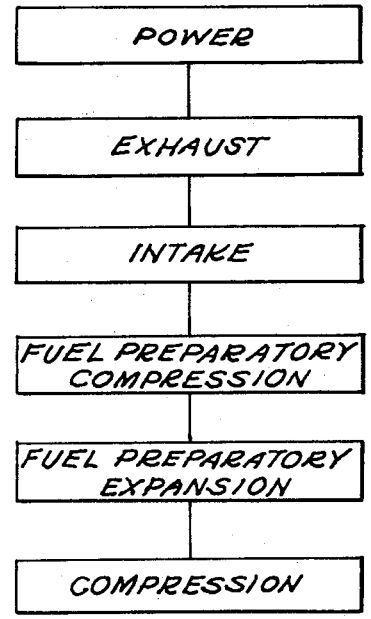
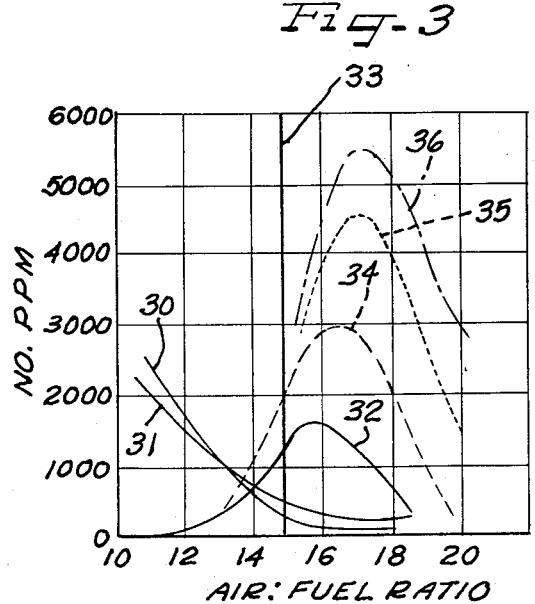
INVENTOR.
Harvey A. Cook
BY *[signature]* ATTORNEYS

3,709,201

LOW EMISSION INTERNAL COMBUSTION ENGINE AND METHOD OF IMPROVING COMBUSTION

BACKGROUND OF THE INVENTION

1. Field of the Invention

The present invention is directed to a method of improving combustion of an internal combustion engine and an internal combustion engine having a low emission.

2. Prior Art

Internal combustion engines such as spark ignited engines having either a two stroke or four stroke mode of operation have been subject to extreme criticism in recent years due to the exhaust emission produced from their operation. The greatest concern is with the exhaust emissions containing combustion products of nitric oxide (NO), carbon monoxide (CO) and hydrocarbons (HC). The presence of hydrocarbons and carbon monoxide in the exhaust emissions from internal combustion engines increase as the air-fuel ratio is selected to be rich in fuel and the presence of nitric oxide (NO) increases when the air-fuel ratio is rich in air such as a lean mixture.

One solution to the problem of forming undesirable combustion products is to utilize a mixture which is rich in fuel and which would produce hydrocarbons and carbon monoxide with a very small percentage of nitric oxide. Then the hydrocarbons and carbon monoxide would be removed by use of a thermoreactor or catalytic muffler using additional air injection. This solution would increase fuel consumption and require additional equipment to clean up the exhaust emission. Another solution is utilizing a lean mixture of fuel and air which would produce large amounts of the nitric oxide which would have to be subsequently reconstituted to nitrogen and oxygen by a catalytic process to rectify the excess air and is an expensive solution.

It has been suggested that if the fuel-air ratio is at a stoichiometric ratio a chemically correct mixture would be present and no excess fuel or oxygen would be present to form these undesirable combustion products. However, tests show that even with a correct stoichiometric air-fuel mixture, the undesirable production of hydrocarbons, carbon monoxide and nitric oxide still occurs. An explanation for this occurrence of these undesirable combustion products is maldistribution of the mixture to the cylinder with each of the cylinders of the engine receiving a different air-fuel ratio. However, even with the use of an improved carburetor system or fuel injector system, the undesirable emissions are still present even with a stoichiometrically correct air-fuel ratio.

SUMMARY OF THE INVENTION

The present invention is directed to a method and apparatus for performing the method to improve the combustion of the air-fuel mixture to reduce the emission of undesirable combustion products from the apparatus by subjecting air-fuel mixture to two additional strokes between the intake of the air and fuel into the cylinder and the spark ignition of the engine cycle to increase the time for mixing of the fuel and air and to insure that all of the fuel is in a vapor form at the time of the spark ignition. A preferred embodiment of the invention is a six-stroke engine having a power stroke, an exhaust stroke, an intake stroke, a fuel preparatory compression stroke, a fuel preparatory expansion stroke, a compression stroke with the spark ignition.

Accordingly, it is an object of the present invention to provide a method of improving the homogeneity of a fuel and air mixture prior to combustion in an internal combustion engine.

Another object of the present invention is to provide an internal combustion engine having a spark ignition which subjects a fuel and air mixture to a fuel preparatory compression stroke and a fuel preparatory expansion stroke followed by a regular compression stroke which ends with an ignition spark.

A still further object of the present invention is a method and internal combustion engine for mixing fuel and air to increase the homogeneity and reduce the emission of undesirable combustion products.

Yet another object of the present invention is to provide a low emission internal combustion engine having a spark ignition.

Other objects, features and advantages of the invention will be readily apparent from the following description of certain preferred embodiments taken in conjunction with the accompanying drawings, although variations and modifications may be effected without departing from the spirit and scope of the novel concept of the disclosure.

BRIEF DESCRIPTION OF THE DRAWINGS

FIG. 1 is a cross-section of a cylinder with portions in elevation of an internal combustion spark ignited internal combustion engine of the present invention;

FIG. 2 is a flow sheet which illustrates the preferred sequence of strokes for the present invention; and FIG. 3 is a graph illustrating the amount of different combustion products in relation to the air-fuel ratio.

DESCRIPTION OF THE PREFERRED EMBODIMENTS

Although the principles of the present invention will find utility in various internal combustion engines having a spark ignition, they are described when incorporated in a low emission internal combustion engine generally indicated at 10 in FIG. 1. The engine 10 has the housing 11 which is composed of a crankcase portion 12 and an upper portion 13 which has means forming at least one cylinder 14. A piston 15 which is connected by appropriate linkage 16 to a crank 17 of a crankshaft 18 is disposed in each cylinder 14. The portion 13 also has means for introducing air or an air-fuel mixture to the cylinder 14 which means is a passageway 20 having an intake valve 21 controlled by an actuating means 22. To enable the removal of combustion products from the cylinder 14, an exhaust system including an exhaust passageway 23 cooperating with an exhaust valve 24 which has an exhaust valve actuating means 25 is also provided on the upper portion 13. To provide a spark for igniting the air-fuel mixture, means for providing a spark such as a spark plug 26 is provided in the upper portion 13 of each of the cylinders 14 and in connection to an appropriate ignition system. The low emission engine 10 is substantially similar in construction to a standard four-cycle engine having exhaust valves and intake valves. The major difference is in controlling the actuation of the intake and exhaust valves by the actuating means 22 and 25 so that the piston 15 reciprocates through two additional strokes to provide a fuel preparatory compression stroke and fuel preparatory expansion stroke prior to ignition during each cycle of operation. Thus, the low emission engine 10 has a six-stroke engine having a sequence of strokes diametrically illustrated in FIG. 2 of a power stroke, an exhaust stroke, an intake stroke, a fuel preparatory compression stroke, a fuel preparatory expansion stroke, and a second or final compression stroke ending with the providing of a spark to the compressed air-fuel mixture to initiate the power stroke. The engine 10 besides having changes in the actuating means for the exhaust valve and the intake valve also may have modifications in the crankshaft over that of a crankshaft in an ordinary four-cycle engine to provide the necessary balance for a six-stroke cycle and to insure the proper timing for firing of each cylinder.

In operation, the crank 17 moves approximately one-half revolution between top dead center and bottom dead center for each stroke with the piston 15 being displaced in the cylinder 14 a corresponding distance. Thus, during the power stroke, the piston 15 moves from the position illustrated to a bottom dead center position. During the following exhaust stroke, the piston moves from the bottom dead center position back to the position illustrated in FIG. 1 to force the combustion products out through the open exhaust valve into the exhaust system. At the completion of the exhaust stroke, the exhaust valve 24 is closed and the intake valve 21 is opened and the piston draws in a new charge of air-fuel mixture which is prepared by a carburetor associated with the engine. At the completion of the intake stroke, the piston again moves towards the top dead center position to compress the air-fuel mixture in the first compression stroke which is identified as a fuel preparatory compression stroke. As the piston completes the fuel preparatory compression stroke, the piston 15 moves from a top dead center position back to a bottom dead center position for a fuel preparatory expansion stroke and then a second compression stroke is initiated with a spark being provided by the spark plug 26 at or near the end of the second compression stroke.

As in known four-stroke engines, the fuel intake valve 21 may be closed at a point after the piston has passed bottom dead center for example as the crank moves through an arc of 55° past bottom dead center so that the compression stroke of the fuel preparatory compression stroke is shorter than the complete movement from a top dead center to a bottom dead center position for the piston. Also, due to the timing for the engine, the spark may be applied to the compressed mixture at some angular distance for the crank 17 prior to reaching a top dead center. For example, 45° before top dead center to provide sufficient time for the spark or flame to progress through the compressed fuels.

As mentioned hereinabove, if the mixture of air and fuel is rich in fuel, the oxygen present is insufficient to obtain complete combustion of the ingredients of the fuel and results in combustion products of hydrocarbons and carbon monoxides being formed. If the air-fuel mixture is rich in air and is a lean mixture, there is excess oxygen which would produce the desired combustion for the ingredients of the fuel to reduce the amounts of hydrocarbons and carbon monoxide in the exhaust gases; however, the additional oxygen reacts with the nitrogen in the air to form nitric oxide. The graph of FIG. 3 has a curve 30 representing the relationship of the combustion product carbon monoxide with the air-fuel ratio, a curve 31 representing the formation of hydrocarbons in the exhaust products and a curve 32 representing the formation of nitric oxide.

Theoretically if the air-fuel ratio were at a stoichiometrically correct ratio indicated by the vertical line 33, all of the hydrogen and carbon atoms should be united to form water and carbon dioxide and the undesirable combustion products of nitrogen oxide, carbon monoxide, and hydrocarbons should not be produced. However, tests of regular four-cycle engines indicate that even with a stoichiometrically correct air-fuel ratio undesirable combustion products are formed. A first suggestion for this occurrence is that even though a carburetor is providing the correct fuel-air ratio the distribution of the fuel mixture to each of the cylinders is uneven resulting in some cylinders being rich in fuel and other cylinders being lean in fuel. However, even with an improved carburetor system or with fuel injection, the formation of the undesirable combustion products still occurs when a stoichiometrically correct ratio for the air-fuel mixture is used. An explanation for the presence of an undesirable combustion product even with each cylinder receiving a correct stoichiometric ratio for the air and fuel that the mixture is segregated in areas in the cylinder which are rich in fuel and lean in fuel. Thus when ignited by a spark, the flame progresses through portions of the mixture which are rich in fuel and lean in fuel. In the graphical representation of FIG. 3, curves identified by element numbers 34, 35 and 36 represent the formation of the nitric oxide in relation to the air-fuel ratio when the spark occurs at 15° before top dead center, 30° before top dead center, and 45° before top dead center, respectively. Thus it is seen, from these curves that the formation of nitric oxide increases as the spark is advanced to a greater angular distance before top dead center. With a greater advance, there is a correspondingly less time for the fuel and air to mix in the cylinder during the compression stroke resulting in a greater chance for the occurrence of areas which are rich in fuel and areas which are rich in oxygen.

Assuming for purposes of this discussion, that a four-stroke engine has the intake valve closing at 55° after bottom dead center and spark ignition occurs at 35° before top dead center, the compression stroke is limited to approximately 90° of rotation between the closing of the valve and the application of the spark. The six stroke engine of the present invention increases the time for the air and fuel to mix by the provision of two additional strokes or 360° of rotation of the crank 17. Thus, if the time for closing the intake valve and the applying of the spark for ignition are at the same angular positions, the time for mixing is 450° of rotation of the crank shaft 18 versus 90° of rotation in the four-stroke engine. With this increase in time mixing, additional time is allowed to achieve a homogeneous air-fuel mixture with less chance of the compressed fuel-air mixture at the time of spark ignition having segregated areas of a high fuel concentration and high oxygen concentration. Also, the compressing, expanding and recompressing of the mixture provides a greater turbulence in the cylinder which results in a better mixing of the constituents of the fuel and air.

Even with a stoichiometrically correct air-fuel ratio, another explanation for the formation of the undesirable combustion products is that the fuel may be in a liquid form such as droplets on moving parts such as the head of the piston and not completely vaporized. This is especially true when a fuel injection system is utilized since the liquid is sprayed into the cylinder during the compression stroke with a portion of the fuel as a liquid. The mixture is not homogeneous and the combustion of the liquid fuel will usually produce hydrocarbons and carbon monoxide in the exhaust products.

A fuel such as gasoline is made up of a mixture of various ingredients which have different vapor pressures and therefore different rates for vaporizing. By increasing the temperature of a liquid, the rate of vaporizing will increase; however, an increase in the ambient pressure of the vapor-air mixture adjacent the liquid opposed further vaporizing and reduces the rate of vaporizing.

During a compression stroke the mixture of air and vapor will become heated as the pressure on the mixture increases. However, liquid fuel in the cylinder is not compressed and it is heated by the transfer of heat from the contact with the compressed gas. As the air-vapor mixture is compressed, the vaporization of the liquid droplets of fuel is opposed by the increased ambient pressure and thus, in a conventional four-cycle engine, a portion of the fuel may still be in a liquid form at the time of combustion.

In a six-stroke engine, the vapor-air mixture is heated by the compression occurring during the fuel preparatory compression stroke and any liquid droplets of fuel in the cylinder will be heated by heat transfer. When the expansion stroke occurs, the air-vapor mixture will have a decrease in pressure and temperature; however, the liquid fuel will not lose its heat as fast as the expanded mixture and will vaporize faster due to the drop in the ambient pressure. Since the intake valve 21 closes after the start of the first compression stroke, the volume in the cylinder at the end of the expansion stroke is greater than at the time of the closing of the intake valve 21 and depending upon the amount of heat transferred to the vapor-air mixture from the engine parts such as the piston and cylinder walls, the pressure in the cylinder at the end of the expansion stroke may be less than the pressure at the time of closing of the intake valve 21, to further accelerate the vaporization of any fuel still in the liquid form. Thus the pressure drop in the cylinder during the expansion step promotes the complete vaporizing of any droplet of fuel that was present in the cylinder besides providing additional time for mixing the fuel and air into a homogeneous mixture of the chemically correct ratio for combustion without producing the undesirable combustion products.

In all internal combustion engines, consideration for cold starting are important. When an engine is cold, vaporization of the fuel is never complete. Furthermore, most engines are provided with a rich mixture at the start-up times and until it reaches a warm operating temperature to insure sufficient vaporization of the fuel to provide sufficient fuel to provide power for engine operation. As the temperature of the engine warms up, the fuel-air mixture is gradually changed to approach a stoichiometrically correct ratio. In the six-stroke engine, a similar adjustment in the fuel-air mixture for start-up will be necessary and will be utilized to cause a rich mixture during initial warm-up periods to enable starting of a cold engine.

As mentioned hereinabove, the actuating means 22 for the intake valves 21 can be cam actuated by a cam shaft. This is also true of the actuating means 25 for the exhaust valve 24. Thus a conventional V-8 engine having overhead cams can be readily modified into a six engine by changing the drive ratio from 1:2 to 1:3 between the overhead cam shafts and the crank shaft. It is also contemplated that in certain cases that the crankshaft will require modification to provide the proper balance for an engine having a six-stroke operation. It is anticipated, that the six-stroke engine can also be utilized in a one cylinder engine, a two cylinder engine with the cylinders either in line or in opposed relationship, a three cylinder engine with the cylinders arranged in line, a four cylinder engine with the cylinders arranged as a V-4 configuration, a six cylinder engine, a nine cylinder engine with the cylinders either in line or in a delta configuration, and a 12 cylinder engine with the cylinders in a 90° V arrangement. In each of the above engine configurations, the a proper balance for the six-stroke operation. For example, a six cylinder engine would have one cylinder firing every half revolution of the crankshaft which would have six cranks with three cranks being 180° from the remaining three crank. Another example would be a four cylinder engine with the cylinder in a 90° V arrangement and with a firing interval of three-fourths of a revolution of the crank shaft which would have two cranks with each crank being connected to two cylinders and being 180° apart.

Although minor modifications might be suggested by those versed in the art, it should be understood that I wish to employ within the scope of the patent warranted hereon all such modifications as reasonably and properly come within the scope of my contribution to the air.

I claim as my invention:

1. A method of improving the combustion of the fuel and air mixture in an internal combustion engine to reduce the amount of undesirable exhaust products comprising the steps of providing a mixture of fuel and air in a cylinder, compressing the fuel and air in the cylinder to reduce its volume and increase its temperature, expanding the compressed mixture to increase its volume, and then recompressing the mixture a second time to again reduce its volume and increase its temperature, igniting the compressed mixture to provide a power stroke for the cylinder and then exhausting the combustion products whereby the additional steps of compressing and expanding increase the time for vaporization of the fuel prior to ignition and insure a better mixing of the fuel-air mixture to provide a homogeneous fuel-air mixture for ignition to reduce the formation of undesirable combustion products.

2. A low emission engine having a six stroke cycle comprising at least one cylinder having an exhaust valve, means for supplying fuel and air to the cylinder including an intake passageway having an intake valve, and means providing an ignition spark, a piston connected to a crank shaft disposed in the cylinder for reciprocation, means opening the exhaust valve during one stroke of every six strokes of the piston to provide an exhaust stroke for the cylinder, and means for actuating said means for supplying fuel and air during an intake stroke following the exhaust stroke by opening the intake valve during the intake stroke and closing the intake valve approximately after completion of said intake stroke so that both the intake valve and the exhaust valve are closed as a volume of fuel and air supplied to the cylinder during the intake stroke is subjected to a compression stroke, an expansion stroke and a second compression stroke prior to ignition by the spark provided by said ignition means to initiate the power stroke of the piston, said compression, expansion and second compression stroke insuring vaporization of the fuel and a homogenity of the fuel vapor and air mixture to improve the combustion of the mixture with a reduction in the undesirable exhaust products.

3. In an internal combustion engine having a housing containing at least one cylinder with a piston connected to a crank shaft disposed therein, each cylinder having an exhaust valve through which combustion products are removed from the cylinder and means for supplying a mixture of air and fuel to the cylinder including an intake valve, the improvement comprising means controlling both the exhaust valve and the intake valve and maintaining the exhaust and intake valves closed as the piston moves through a fuel preparatory compression stroke, a fuel preparatory expansion stroke, a second compression stroke and power stroke after introduction of a volume of the fuel and air mixture into the cylinder to isolate the mixture in the cylinder so that the volume of fuel and air mixture is compressed, expanded and recompressed prior to ignition to insure vaporization of the fuel and a homogeneous air and fuel vapor mixture at the time of ignition to decrease the production of undesirable combustion products.

4. An internal combustion engine according to claim 3, wherein said engine has a six stroke engine cycle comprising an intake stroke, fuel preparatory compression stroke, a fuel preparatory expansion stroke, a second compression stroke, a power stroke and an exhaust stroke.

* * * * *